(12) United States Patent  
Holmes

(10) Patent No.: US 7,946,527 B2
(45) Date of Patent: May 24, 2011

(54) AIRCRAFT WITH FIXED, SWINGING AND FOLDING WINGS

(76) Inventor: Alan Glen Holmes, Clarkston, MI (US)

(*) Notice: Subject to any disclaimer, the term of this patent is extended or adjusted under 35 U.S.C. 154(b) by 650 days.

(21) Appl. No.: 11/900,090

(22) Filed: Sep. 10, 2007

(65) Prior Publication Data

US 2009/0302151 A1    Dec. 10, 2009

(51) Int. Cl.
*B64C 3/56* (2006.01)
(52) U.S. Cl. ............................. 244/49; 244/46
(58) Field of Classification Search .............. 244/49, 244/45 R, 46
See application file for complete search history.

(56) References Cited

U.S. PATENT DOCUMENTS

| 1,310,389 | A | * | 7/1919 | Cerruti | 244/46 |
|---|---|---|---|---|---|
| 1,458,787 | A | * | 6/1923 | Walden | 244/49 |
| 1,501,530 | A | * | 7/1924 | Driggs | 244/49 |
| 1,590,880 | A | * | 6/1926 | Broquist | 244/49 |
| 1,718,617 | A | * | 6/1929 | Wagner | 244/49 |
| 1,890,354 | A | * | 12/1932 | Armour et al. | 244/49 |
| 1,928,336 | A | * | 9/1933 | Kindelberger | 244/49 |
| 1,998,148 | A | * | 4/1935 | Vieriu | 244/49 |
| 2,162,066 | A | * | 6/1939 | De Asis | 244/49 |
| 2,410,239 | A | * | 10/1946 | Roe | 244/49 |
| 2,573,271 | A | * | 10/1951 | Perl | 244/2 |
| 2,741,444 | A | * | 4/1956 | Baynes | 244/46 |
| 2,744,698 | A | * | 5/1956 | Baynes | 244/218 |
| 2,812,911 | A | * | 11/1957 | De Jean | 244/49 |
| 3,405,280 | A | * | 10/1968 | Willox | 244/46 |
| 3,405,891 | A | * | 10/1968 | Jacquart et al. | 244/218 |
| 3,612,440 | A | * | 10/1971 | Strong | 244/2 |
| 3,647,163 | A | * | 3/1972 | Swwwney | 244/49 |
| 4,022,403 | A | * | 5/1977 | Chiquet | 244/46 |
| 5,766,055 | A | * | 6/1998 | Kim et al. | 446/62 |
| 6,119,976 | A | * | 9/2000 | Rogers | 244/13 |

* cited by examiner

Primary Examiner — Tien Dinh
Assistant Examiner — Philip J Bonzell

(57) ABSTRACT

An aircraft with wings that may be fixed for flight and which swing and fold for storage and for maneuvering and otherwise operating the aircraft while not in flight is disclosed. An embodiment includes wings which swing backwards and through the body of the aircraft and then fold by drooping elevons which span the trailing edges of the wings along the sides of the body. Another embodiment includes wings which swing forward and control surfaces which fold upwards at the sides of the aircraft. The invention provides for a narrow width for the aircraft when not in flight using a simple mechanism.

16 Claims, 2 Drawing Sheets

AIRCRAFT WITH FIXED, SWINGING AND FOLDING WINGS

BACKGROUND OF THE INVENTION

The invention concerns an aircraft with wings which are fixed for flight and which may both swing and fold when the aircraft is not in flight.

Aircraft have been using wings to make manned, controlled flights for over 100 years, starting with the airplane flown by the Wright brothers in 1903. Aircraft have advantages in speed and freedom of movement, yet they are, compared with many machines of similar complexity, relatively rare. Aircraft have only been produced in numbers of a few thousand of each individual type. Aircraft use has been confined mainly to warfare and to the carrying of paying passengers in largest and fastest airplanes practical between huge airports on the outskirts of large cities. The inventor supposes the lack of production of aircraft and of flexibility in their use may be due in part to the difficulty in storing airplanes and maneuvering them when not in flight.

Airplanes lift themselves by the action of fixed wings on the air, and the greater the amount of air, the more efficient is the lifting. This fact makes a large wingspan, as compared with the weight of the aircraft, very important to high efficiency. Only with structurally efficient materials, design and construction can an airplane be equipped with efficient wings. Such wings, which are rigid and span a relatively large space, have made airplanes difficult to store. Only airplanes designed for naval warfare, and so for storage aboard ships, have commonly used wings that are customarily folded upon landing and then unfolded again for flight. The inventor supposes an aircraft with folding wings that offer sufficient benefit in comparison with their added weight and cost has been lacking.

An exemplary design for an airplane for naval warfare is that of the F-14 Tomcat, which was constructed with wings that swing, rather than fold. That is, the wings rotate approximately in their own plane, maintaining the same orientation with the ground, and rotating about an essentially vertical axis. The swinging wings are useful to reduce wing span not only for storage aboard ship, but also to greatly improve speed and maneuvering while flying at high speeds. With swinging wings, however, the solid area of the aircraft when viewed from above, that is in plan or in the top view, is essentially unchanged, the F-14 barely fit aboard the largest ships, and the F-14 cannot itself operate on the water.

Airplanes are challenging to store because they are designed to fly. One aspect of this challenge is that a parked airplane may be blown about by a strong wind, especially if the airplane is relatively light, such as an airplane for carrying a few people. Swinging wings, such as those on the F-14, do only a little to reduce this problem, since they reduce wing span but do not significantly reduce the solid area of the aircraft in plan. Known folding wings may reduce the solid area of an aircraft in plan, but if so, they typically add solid area in the side view, area which is also affected by winds on the ground or at sea. Another aspect of this challenge of storage is that the wings may be somewhat easily damaged while on the ground or at sea, and swinging alone or folding alone typically does little or nothing, besides reducing wing span, to protect the wings.

BRIEF SUMMARY OF THE INVENTION

An object of the invention is to provide an aircraft with wings that may be fixed for flight and which may both swing and fold when the aircraft is not in flight, to reduce the space required to maneuver and otherwise operate the aircraft when not in flight and to store the aircraft. An aspect of the invention is that the fixed, swinging and folding wings provide sufficient wing span for efficiency in flight and then greatly reduce the width of the aircraft when it is not in flight. An aspect of an embodiment of the invention is that the fixed, swinging and folding wings substantially reduce the solid area of the aircraft in plan, and keep nearly constant the solid area of the aircraft when viewed from other directions. An aspect of an embodiment of the invention is that the fixed, swinging and folding wings may be stored in part within the body of the aircraft for protection.

DETAILED DESCRIPTION OF THE INVENTION

Figure 1:
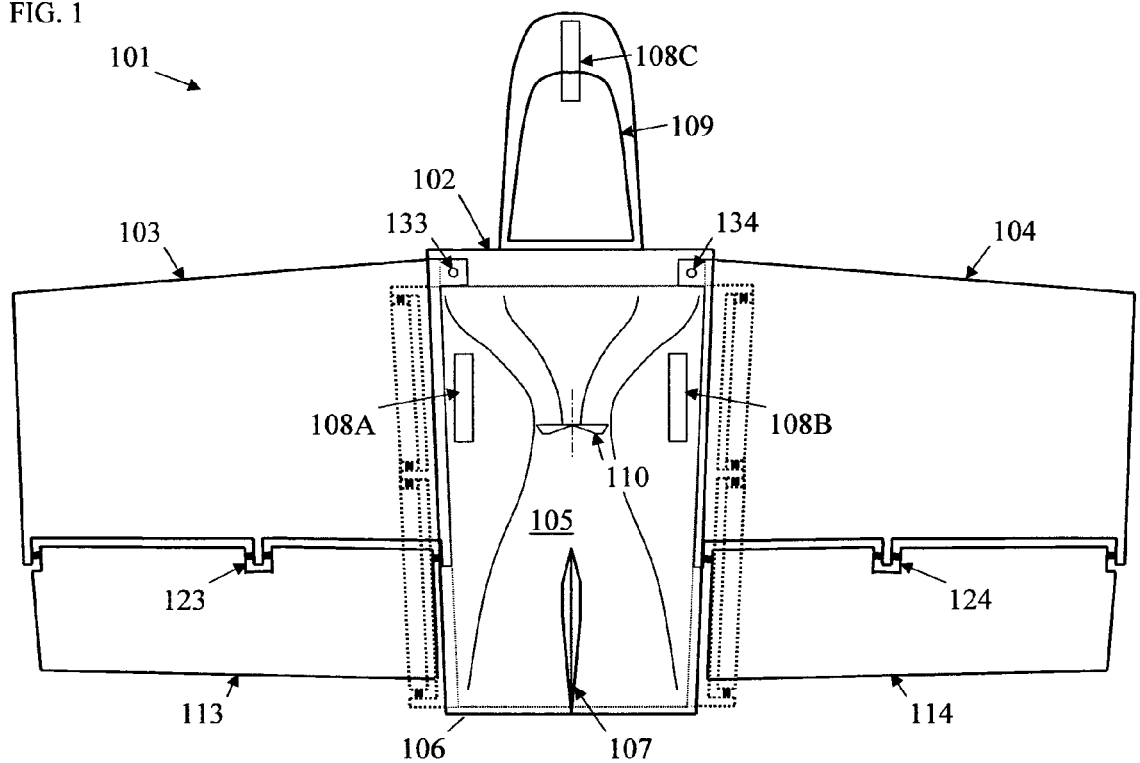
FIG. 1 is a plan or top view of an aircraft with fixed, swinging and folding wings, showing both a position for flight and a stored position (dotted lines).
Figure 2:
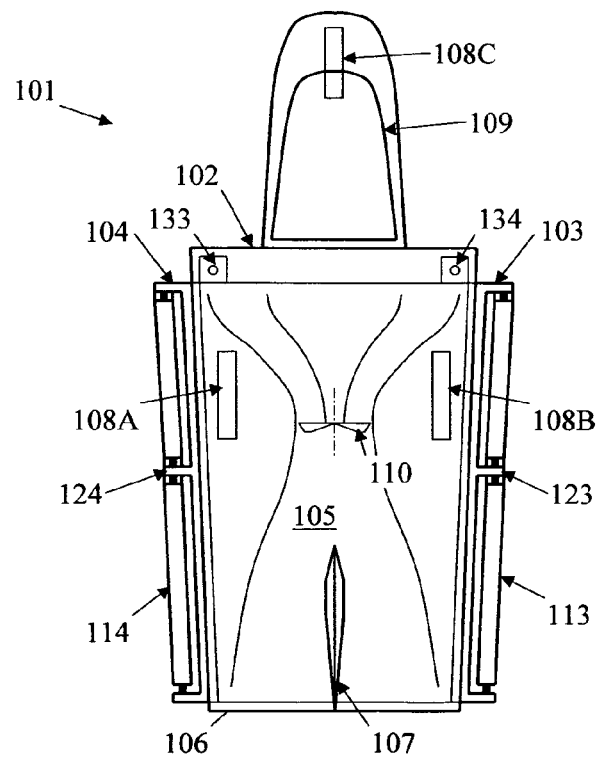
FIG. 2 is a plan or top view of the same aircraft with fixed, swinging and folding wings, showing a stored position.
Figure 3:
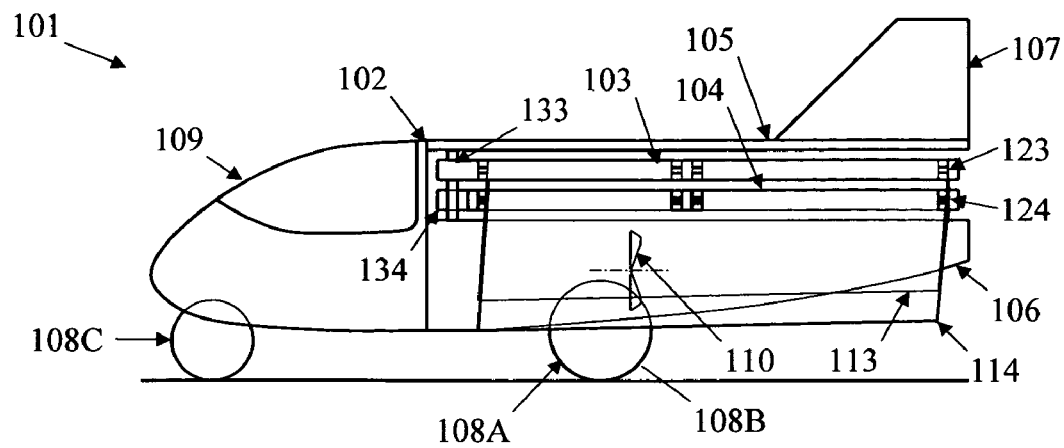
FIG. 3 is an elevation or side view of the same aircraft with fixed, swinging and folding wings, showing a stored position.

FIGS. 1, 2, and 3 show a preferred embodiment of the invention, which is an aircraft 101 with a body 102, a left wing 103, and a right wing 104. The aircraft is an airplane, that is, an aircraft that is lifted in flight by wings which may be fixed with respect to the rest of the aircraft while flying.

The term "wing" has been used by others to describe both wings of an airplane together, and is linked with the terms "monoplane" (one wing), "biplane" (two wings, one atop the other), "tandem wing" (two wings, one following the other), etc. It should be clearly understood that the use of the term "wings" in describing and claiming the invention does not limit the invention to biplanes, tandem wing aircraft, etc.

It should also be clearly understood that while the wings are said to be "fixed", this term, as is commonly understood by those skilled in the art, as in "fixed-wing aircraft," does not preclude the moving of the wings or parts thereof in flight for control, efficiency, etc. The wings of the Wright brothers' airplane of 1903 are fixed in this sense, although warping the wings was an essential feature to control the aircraft. The F-14 Tomcat is also considered a "fixed-wing" aircraft, although its wings swing in or out for best efficiency at different speeds. These and similar motions still allow, by common understanding, the airplane wings to be accurately described as "fixed".

Furthermore, the invention is applicable to any aircraft with fixed wings. An alternate embodiment of the aircraft (not shown) could be equipped with wings that could be fixed for flight and also a rotor to provide lift under certain conditions of flight, such as for hovering or flying at very low speeds. In such a case the aircraft might be classified as a helicopter or auto-gyro, but the aircraft could include wings that could be fixed for lifting the aircraft in flight and could therefore include the invention.

The wings 103, 104 of the aircraft 101 are also of rigid material, in that they are made of metal, carbon-fiber-plastic composite or similar, relatively stiff material. Such wings are distinguished from wings covered with relatively flexible fabric, which were used by the Wright brothers and continue to be used for some low-speed aircraft. While it is relatively easy to fold wings covered with flexible fabric, wings of rigid material have advantages in structural efficiency, in holding an airfoil shape at higher speeds, in resistance to puncturing, snagging and tearing, and in overall durability. Providing wings of rigid material which fold simply and effectively is an aspect of this embodiment.

An airplane typically has a tail, including horizontal aerodynamic surfaces distinct from the wings and used to provide stability in flight. The aircraft 101 has a vertical tail 107. The action of a horizontal is incorporated into the wings 103, 104, by size and design, especially by extending the wings rearward toward the rear of the body 102. The aircraft 101 has no horizontal tail, which is preferred, in that the horizontal surface area that provides this stabilizing function is incorporated into the wings 103, 104 and so this area swings and folds with them to reduce the size of the aircraft.

An airplane typically has control surfaces, that is, moveable surfaces on the aircraft, which may be directed for maneuvering the airplane as it flies through the air and which may include: ailerons hinged along the trailing edges of the wings, elevators hinged along the trailing edges of the horizontal tail, and a rudder hinged along the trailing edge of the vertical tail. Ailerons can roll the aircraft left and right, elevators can pitch the aircraft up and down, and the rudder can yaw the aircraft left and right.

Alternately, functions of these control surfaces may be combined, such as by the use of elevons for the functions of both elevators and ailerons, especially in the case of an aircraft without a horizontal tail. FIGS. 1, 2, and 3 show a left elevon 113 as a part of the left wing 103 and attached by a left hinge 123 to the rest of that wing and also a right elevon 114 as a part of the right wing 104 and attached by a right hinge 124 to the rest of that wing. Each hinge 123, 124 is a joint between the respective elevon 113, 114 and the remainder of the wing 103, 104 which allows the elevon to move, that is to fold, along the hinge relative to the rest of the wing, as is well known to those skilled in the art.

The left wing 103 can swing using a left pivot joint 133, and the right wing 104 can swing using a right pivot joint 134. Each pivot joint 133, 134 is located near the leading edge and the inboard end of the respective wing 103, 104, referring to the wing as it is positioned for flight. The wings 103, 104 remain essentially horizontal as they swing, although a small angle of a few degrees may be useful to allow them to overlap one another. A small amount of vertical motion in each pivot joint 133, 134 may be used to allow wings at the same level in flight to overlap one another.

As the wings 103, 104 swing from their flight position toward their stored position, the left hinge 123 crosses over the right wing 104 and the right hinge 124 crosses over the left wing 103. The hinges 123, 124 and elevons 113, 114 pass under an upper part 105 of the body 102 and the tail 107 and over a lower part 106 of the body.

The left wing 103 overlaps the right wing 104, in plan, that is when viewed from above or in the top view, in the stored position, as shown in FIGS. 1 and 2. This overlap significantly reduces the solid area of the aircraft 101 in plan with the wings in the stored position and decreases the effects of winds on the aircraft while not in flight. This overlapping of the wings also places both elevons 113, 114 in positions above free space, where both can be folded to vertical positions using the hinges 123, 124.

In this embodiment, the hinges 123, 124 are used both for control in flight and for moving the wing, especially the elevons 113, 114, from a position for flight to a position for storing or maneuvering the aircraft 101 when not in flight. When used to pitch the aircraft 101 up or down, the elevons 113, 114 both move in the same direction, either both downward or both upward. Both elevons 113, 114 move downward, that is, droop, for storage. For storage, the hinges 123, 124 droop the elevons 113 or 114 more than 60 degrees, that is fold the elevons sharply with respect to the rest of the wings 103, 104, to essentially vertical positions which eliminate a majority of the plan area for the elevons.

Each of the elevons 113, 114 fully spans the wing 103, 104 to which it is hinged, so that folding the elevons reduces the whole width of the stored wings in plan. Thus, the maximum width of the stored wings 103, 104 is reduced and the maximum width of the aircraft in this configuration is reduced, with the several benefits described.

The upper part of the body 105 covers part of the wings 103, 104, when stored, which is shown in FIGS. 1, 2, and 3, especially in FIG. 3. That is, the upper of the body 105 covers the remainder of the upper stored wing, the right wing, 104, which in turn covers, in part, the remainder of the lower stored wing, the left wing 103. The lower part of the body 106 is covered by the wings 103, 104, when stored, which is shown especially in FIG. 3, and which may protect the wings from debris from the ground.

For an aircraft for use at sea, the lower part of the body 106 may protect the wings 103, 104 from waves and even help to provide floatation for the aircraft for emergency landing or for amphibious operation. The elevons 113, 114, when drooped help to shed water from the wings 103, 104, and when the elevons are folded close to the lower part of the body 106, they afford little space to catch water from below.

The aircraft 101 has wheels 108A, 108B, 108C for supporting the aircraft while on the ground. The main wheels 108A, 108B are partly enclosed by the elevons 113, 114 in their stored position. The nose wheel 108C may be steered for aiding the maneuvering of the aircraft while on the ground. The aircraft 101 has a canopy 109 for entry and egress of any occupants and for visibility while piloting and maneuvering the aircraft. The aircraft is also provided with a propulsion device which in this embodiment a fan 110, such as part of a turbofan engine or, alternately, a fan connected to a piston engine. The wings 103, 104 while in the stored position allow the fan 110 to be operated for maneuvering the aircraft on the ground or water.

A transformation in the aircraft 101 from the flight position for the wings 103, 104 shown in FIG. 1 to the stored position shown in FIGS. 1 (dotted lines), 2, and 3 is, for the embodiment show therein, as follows. The left and right elevons 113, 114 each assume an essentially flat position with respect to the rest of the left and right wings 103, 104, respectively. The left and right wings 103, 104 swing using left and right pivots 133, 134, respectively, inward, with the right wing 104 above and overlapping the left wing 103, and both wings, especially the elevons 113, 114, passing through the body 102, that is below a part of the body 105 and above another part of the body 106. With left hinge 123 positioned along the right side of the body, and right hinge 124 positioned near the left side of the body, the elevons 113, 114 fold sharply downward, or droop, which reduces the width of the aircraft 101 for maneuvering and otherwise operating the aircraft when not in flight and for storage of the aircraft. This process may be reversed for unfolding the wings 103, 104 for flight.

In operation of the aircraft 101, the swinging and folding sequence described above might be performed near the end of the runway, just after landing. The reverse, or unfolding and swinging sequence also might be performed near the end of the runway, just before engine testing. Thus, the aircraft 101 can become and remain relatively compact, especially in width, while maneuvering and otherwise operating on the ground, especially in going to and from its hangar or parking area.

Figure 4:
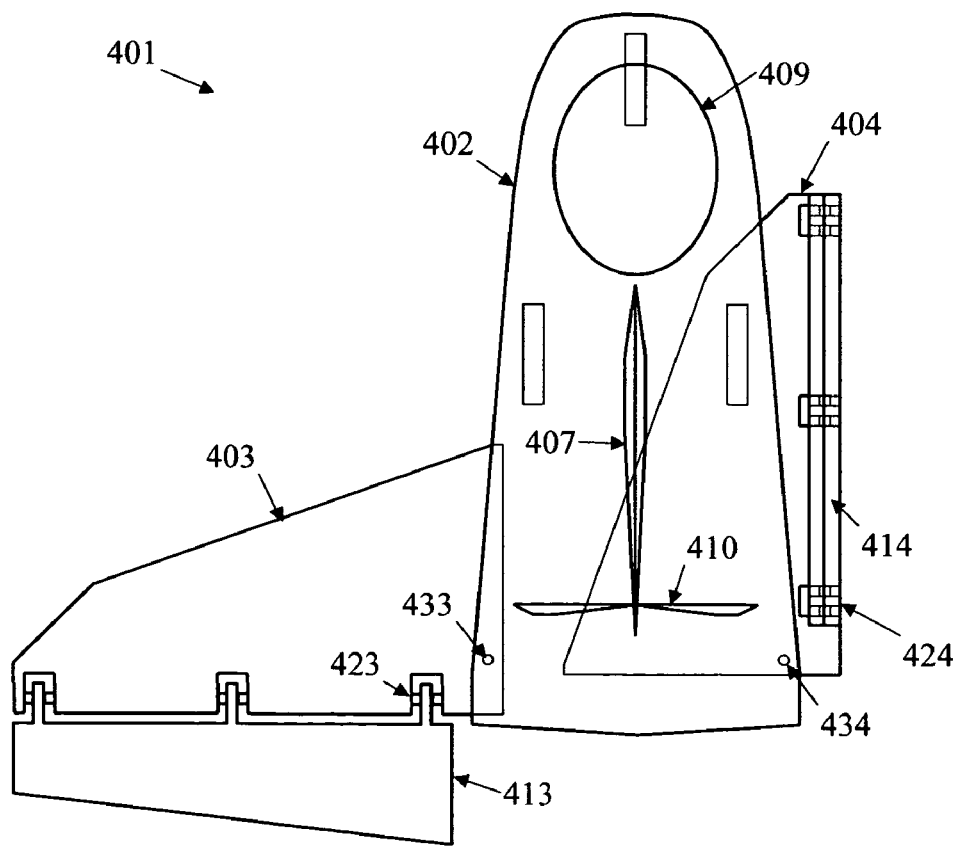
FIG. 4 is a plan view of another aircraft with fixed, swinging and folding wings, with a wing in a position for flight and a wing in a stored position.

In another preferred embodiment of the invention shown in FIG. 4, an aircraft 401 has a body 402 with a substantial width for obtaining lift, a first wing 403, and a second wing 404. The first wing 403 includes a control surface 413, a folding joint 423 for moving the control surface relative to the rest of the wing, and a swinging joint 433 for moving the wing relative to the body 402. The second wing 404 includes a control surface 414, a folding joint 424 for moving the control surface relative to the rest of the wing, and a swinging joint 434 for moving the wing relative to the body 402.

The first wing 403 is shown in an outstretched in a position for flight and the second wing 404 is shown in a folded position for storage. In this embodiment, the swinging joints 433, 434 are located near the folding joints 423, 424, that is near the folding edges of the wings 403, 404. The wings 403, 404 swing using the joints 433, 434 from a position for flight forward to a position for storage, and the control surfaces 413, 414 fold upward from a position for flight to a folded position for storage.

The aircraft 401 has a vertical tail 407, which supports a propeller 410 that is a propulsion device for this embodiment. The wings 403, 404 in the stored position are lower than the propeller 410 in height and allow the propeller to continue to be operated, if desired. The propeller 410 is in part enclosed by the control surfaces 413, 414 when they are folded upwards. Since the control surfaces 413, 414 fold upward and the propulsion device is above the rest of the wings 403, 404, the wings may be just above the wheels so that the canopy 409 allows visibility towards the rear.

According to these examples, there are many other embodiments which may be constructed according to the invention which will be clear to those skilled in the art.

The invention claimed is:

1. An aircraft with a body and swinging and folding rigid left and right wings, each wing including:
   at least one control surface,
   a hinge joint between said control surface and the rest of said wing, and
   a pivot joint near an edge and the inboard end of said wing, wherein:
   the entirety of each of said wings is equipped to swing relative to said body of said aircraft using said pivot joint from a fixed position for flight to a position for storage,
   said rest of one of said wings in part overlaps in plan said rest of the other of said wings in said positions for storage,
   said control surface of each one of said wings does not overlap in plan said control surface of the other of said wings in said positions for storage,
   each said control surface is equipped to fold relative to said rest of said wing using said hinge joint from a position for flight to a position for storage, and
   said control surfaces are folded sharply toward the same direction relative to said rest of said wings in said positions for storage.

2. The aircraft of claim 1, wherein each said control surface is stored in a raised position.

3. The aircraft of claim 2, wherein said rest of said wings are essentially horizontal in said position for storage.

4. The aircraft of claim 3, wherein said control surfaces fully span said wings.

5. The aircraft of claim 4, wherein said control surfaces are positioned at the rear of the aircraft in said position for flight and are useable as elevons.

6. An aircraft with a body and swinging and folding rigid left and right wings, each wing including:
   at least one control surface,
   a hinge joint between said control surface and the rest of said wing, and
   a pivot joint near an edge and the inboard end of said wing, wherein:
   each of said wings is equipped to swing relative to said body of said aircraft using said pivot joint from a fixed position for flight to a position for storage,
   said rest of said wings in part overlaps in plan said rest of the other of said wings in said positions for storage,
   said control surface of each one of said wings does not overlap in plan said control surface of the other of said wings in said positions for storage,
   said hinge joint of one of said wings crosses over and beyond said position for storage for said rest of the other of said wings and said hinge joint of said other of said wings crosses under and beyond said position for storage for said rest of said one of said wings, as said wings are swung from said position for flight to said position for storage,
   each said control surface is equipped to fold relative to said rest of said wing using said hinge joint from a position for flight to a position for storage, and
   said control surfaces are folded sharply toward the same direction relative to said rest of said wings in said positions for storage.

7. The aircraft of claim 6, wherein each said control surface is stored in a drooped position.

8. The aircraft of claim 6, wherein said control surface of said left wing is stored along the right side of said aircraft and said control surface of said right wing is stored along the left side of said aircraft.

9. The aircraft of claim 8, wherein said control surfaces span said wings.

10. An aircraft including:
    a body,
    wings which for flight extend near to the rear of the body,
    control surfaces which form the trailing edges of the wings,
    a swinging joint between the body and each wing which allows each wing to rotate as a single rigid member from its flight position inward toward the body when viewed from above, and
    folding joints which can be positioned for storage along the sides of the aircraft by swinging of the wings and which allow each control surface to fold toward the same vertical direction as another of the control surfaces and sharply relative to the remainder of the wing of which it is a part to reach a storage position.

11. The aircraft of claim 10, further including at least two main wheels and at least one nose wheel, wherein said main wheels are at least in part enclosed on opposite sides by the control surfaces in their storage positions.

12. The aircraft of claim 10, further including a propulsion device, which is at least in part enclosed on opposite sides by the control surfaces in their storage positions.

13. The aircraft of claim 10, wherein all of the control surfaces forming the trailing edges of the wings fold from their flight positions to essentially vertical storage positions, in the same direction relative to remainders of the wings.

14. The aircraft of claim 13, wherein the wings remain nearly horizontal as they rotate.

15. The aircraft of claim 14, wherein the wings swing rearward from their flight positions to storage positions.

16. The aircraft of claim 14, wherein the wings swing forward from their flight positions to storage positions.

* * * * *